O. A. M. SMITH.
KEYBOARD FOR MUSICAL INSTRUMENTS.
APPLICATION FILED DEC. 3, 1910.
1,009,194.
Patented Nov. 21, 1911.
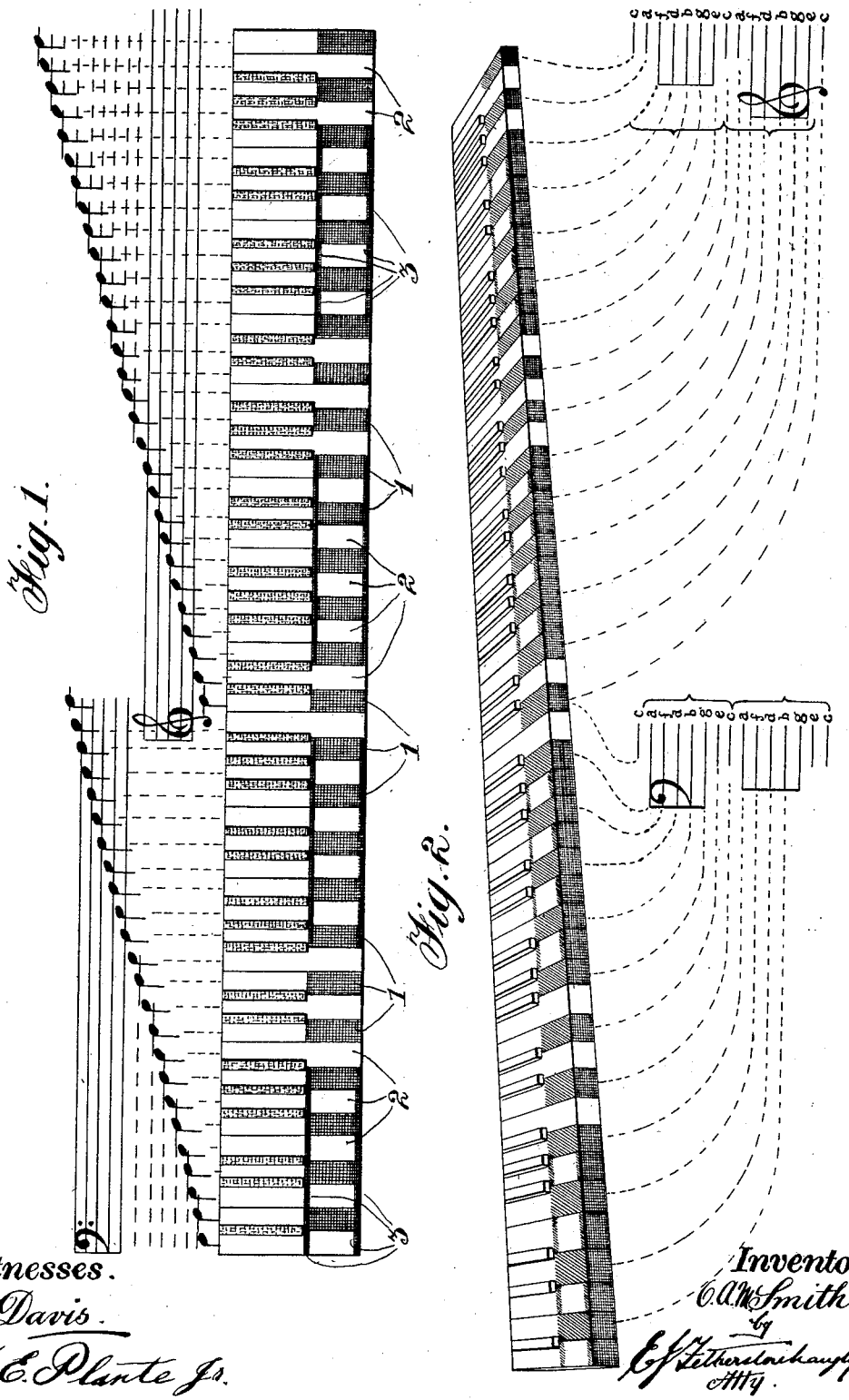
Witnesses.
H. Davis.
H. E. Plante Jr.
Inventor
O. A. M. Smith
by
Atty.

UNITED STATES PATENT OFFICE.

OCTAVIUS ARTHUR MARSHALL SMITH, OF WESTMOUNT, QUEBEC, CANADA.

KEYBOARD FOR MUSICAL INSTRUMENTS.

1,009,194.  Specification of Letters Patent. Patented Nov. 21, 1911.

Application filed December 3, 1910. Serial No. 595,470.

*To all whom it may concern:*

Be it known that I, OCTAVIUS ARTHUR MARSHALL SMITH, a subject of the King of Great Britain, and resident of 4357 Montrose avenue, in the city of Westmount, in the Province of Quebec, in the Dominion of Canada, have invented certain new and useful Improvements in Keyboards for Musical Instruments, of which the following is a specification.

The invention relates to improvements in a keyboard for musical instruments such as pianos, as described in the present specification and illustrated in the accompanying drawings that form part of the same.

The invention consists essentially in distinctive markings applied to certain of the keys of the instrument keyboard, to facilitate the identification of all the keys on said keyboard with the notes as printed or written on the sheet of music.

The object of the invention is to aid performers in the playing of said instruments, whether playing from music or otherwise.

In the drawings, Figure 1 is a diagrammatic view showing a piano keyboard, the base and treble staffs and leger lines above and below said staves together with the scales of notes. Fig. 2 is a perspective view of the keyboard showing lead lines from certain keys of said keyboard to the staff lines and leger lines of the bass and treble.

Like numerals of reference indicate corresponding parts in each figure.

Referring to the drawings, 1 are alternate white keys corresponding to natural notes written on the lines of the staves and on the leger lines, and shown in this keyboard as plainly marked over the touch portion and the front edge, preferably in a dark color. 2 are the intermediate white keys corresponding to natural notes written in the spaces of the staves and between the leger lines, some of said keys being colored or marked by margin lines at the extreme ends of the touch portion; thereby groups of keys are formed corresponding to the line notes embraced in the ordinary bass and treble staves. Thus there are three distinctive keys, namely, the plainly marked line-note keys, the margin marked space note keys, and the space note keys outside of the groups which are left entirely plain. Dividing the instrument from the middle $c$ of the pianoforte keyboard as illustrated, in the bass first below said middle $c$ occurs the plain key corresponding to the note $b$ this being one of the plain space note keys before mentioned. Immediately below this key is a group of five plainly marked keys 1 interspaced by four margin marked keys 2, the former corresponding to the natural notes on the lines of the bass staff and the latter corresponding to the natural notes written in the spaces of the bass staff. Below this group a break occurs distinguished by three plain keys and two plainly marked keys 1, the former corresponding to the natural notes written in the first three spaces below the bass staff and the latter the natural notes written on the first two leger lines below the bass staff. The lowest of the three last mentioned plain keys (representing the note $b$, two octaves below the $b$ next to middle $c$) is the first of a second group of fourteen keys (or so much of a group as the compass of the keyboard permits) marked and arranged as before described. Above the middle $c$ a similar arrangement is shown and immediately above the middle $c$ is, of course, a plain key which corresponds to the note $b$ in the first space below the treble staff, then occurs a group of five plainly marked keys 1, interspaced by four margin marked keys 2, this group corresponding to the nine natural notes of the treble staff. Immediately above this group are three plain keys interspaced by two plainly marked keys 1, the former corresponding to the first three spaces above the treble staff and the latter to the first two leger lines of the treble staff. The highest of the three last mentioned plain keys (representing the note $d$, two octaves above the $d$ next to middle $c$) is the first of a second group of fourteen keys marked and arranged as herein just described and so on according to the length of the keyboard, for the arrangement would be the same whatever the length and no matter how many octaves or keys were added. The same may be said as regards to the bass division of the instrument keyboard.

In the playing of an instrument with this form of keyboard it is not necessary to make a close study of the names of the notes on the staves, particularly in relation to the keyboard, because the grouping of the keys by distinctive markings indicates very pointedly where the note is on the keyboard that is shown on the music.

What I claim as my invention is:

1. A keyboard for pianofortes or the like having the sharps and flats arranged as customary and the natural keys alternately distinctively marked, thereby dividing said natural keys into two sets, one set of which corresponds to the natural notes written on the lines of the music staff, and the other set of which corresponds to the natural notes written in the spaces, certain of the latter being marked in a particular manner to group them with the adjoining keys.

2. A keyboard for pianofortes or the like having the sharps and flats arranged as usual, and in which those keys corresponding to natural notes written on the lines of the staves and on the leger lines are plainly marked over the touch portion, and those keys corresponding to the natural notes written in the spaces are distinctive therefrom, certain of the latter keys having margin lines across the extremities of the touch portion to distinguish them as corresponding to the spaces within the staves.

3. A keyboard for pianofortes or the like in which the alternate natural keys are plainly marked to distinguish them as corresponding to natural notes written on the lines of the staves and on the leger lines, certain sets of five of said plainly marked keys being grouped by transverse margin markings on the four intermediate natural keys, and certain of said plainly marked line note keys and plain space note keys separating said sets, the sharps and flats being in customary arrangement.

4. An instrument keyboard of the pianoforte type forming customary bass and treble divisions below and above the middle C having in each division every natural note key distinctively marked from the same note key one octave removed and similarly marked to the same note key two octaves removed in the particular division.

Signed at the city and district of Montreal, Province of Quebec, Dominion of Canada, this twenty-third day of November 1910.

OCTAVIUS ARTHUR MARSHALL SMITH.

Witnesses:
HARRY DAVIS,
P. SHEE.

---

Copies of this patent may be obtained for five cents each, by addressing the "Commissioner of Patents, Washington, D. C."